(12) United States Patent  (10) Patent No.: US 9,922,314 B2
Chen et al.  (45) Date of Patent: Mar. 20, 2018

(54) EMBEDDED TOUCH POS MACHINE

(71) Applicant: Zhe Lin, Shantou, Guangdong (CN)

(72) Inventors: Guihong Chen, Guangdong (CN); Chuirui Qiu, Guangdong (CN); Bifeng Huang, Guangdong (CN)

(73) Assignee: Zhe Lin, Shantou, Guangdong (CN)

( * ) Notice: Subject to any disclaimer, the term of this patent is extended or adjusted under 35 U.S.C. 154(b) by 0 days.

(21) Appl. No.: 14/409,072

(22) PCT Filed: Oct. 26, 2012

(86) PCT No.: PCT/CN2012/001435
§ 371 (c)(1),
(2) Date: Dec. 18, 2014

(87) PCT Pub. No.: WO2014/032213
PCT Pub. Date: Mar. 6, 2014

(65) Prior Publication Data
US 2015/0248654 A1  Sep. 3, 2015

(30) Foreign Application Priority Data

Aug. 29, 2012 (CN) ..................... 2012 2 0432061 U (51) Int. Cl.
*G06Q 20/20* (2012.01)
*G07G 1/00* (2006.01)
(Continued)

(52) U.S. Cl.
CPC ............... *G06Q 20/20* (2013.01); *B41J 3/46* (2013.01); *B41J 29/02* (2013.01); *B41J 29/13* (2013.01);
(Continued)

(58) Field of Classification Search
CPC ............... G06Q 20/20; H04N 1/00543; H04N 1/00493; H04N 1/00557; H04N 1/00519; B41J 3/46; B41J 29/02; G07G 1/0018
See application file for complete search history.

(56) References Cited

U.S. PATENT DOCUMENTS 7,017,803 B2  3/2006 Ichikawa et al.
D635,198 S  3/2011 Antonopoulos et al.
(Continued)

FOREIGN PATENT DOCUMENTS

CN  1519128 A  8/2004
CN  1645422 A  7/2005
(Continued)

OTHER PUBLICATIONS

International Search Report of the International Searching Authority dated Jun. 6, 2013 for the corresponding international patent application No. PCT/CN2012/001435 (and English translation).
(Continued)

*Primary Examiner* — Benjamin O Dulaney
(74) *Attorney, Agent, or Firm* — Posz Law Group, PLC (57) ABSTRACT

An embedded touch POS machine which integrates input and output, remote signal transmission and reception, and printing, is provided. The embedded touch POS machine comprises a touch screen display, a printer and a mounting bracket. The mounting bracket comprises a box-shaped bracket body constructed of a transverse plate and a vertical plate and a movable bracket lid mounted on a top of the box-shaped bracket body. The touch screen display is disposed on a top face of the bracket lid, the printing head is disposed to a side of a bottom face of the bracket lid, the printer body and the printing paper scroll are disposed on the
(Continued)

transverse plate of the bracket body, and, the printing board is located at a bottom face of the transverse plate of the bracket body.

16 Claims, 4 Drawing Sheets

(51) Int. Cl.
    *G07G 1/12*     (2006.01)
    *B41J 29/02*     (2006.01)
    *B41J 29/13*     (2006.01)
    *B41J 3/46*     (2006.01)
    *H04N 1/00*     (2006.01)

(52) U.S. Cl.
    CPC ............. *G07G 1/0018* (2013.01); *G07G 1/12* (2013.01); *H04N 1/00204* (2013.01); *H04N 1/00326* (2013.01); *H04N 1/00392* (2013.01); *H04N 1/00493* (2013.01); *H04N 1/00543* (2013.01); *H04N 1/00557* (2013.01)

(56) References Cited

U.S. PATENT DOCUMENTS

| | | | |
|---|---|---|---|
| 2005/0156024 A1* | 7/2005 | Ichikawa | G07G 1/0018 235/379 |
| 2006/0132560 A1* | 6/2006 | Silverbrook | B41J 2/04541 347/86 |
| 2006/0133016 A1* | 6/2006 | North | F16M 11/10 361/679.22 |
| 2007/0038517 A1* | 2/2007 | Lin | G06Q 20/204 705/17 |
| 2008/0182639 A1* | 7/2008 | Antonopoulos | G07F 9/02 463/17 |
| 2010/0262504 A1 | 10/2010 | Tamura | |
| 2011/0315076 A1* | 12/2011 | Watanabe | B41J 3/4075 118/503 |
| 2012/0085713 A1* | 4/2012 | Bowser | A47F 5/0807 211/26 |
| 2013/0155595 A1* | 6/2013 | Herring | G07G 1/0018 361/679.21 |
| 2013/0241375 A1* | 9/2013 | Matsumura | H05K 5/03 312/223.1 |

FOREIGN PATENT DOCUMENTS

| | | |
|---|---|---|
| CN | 101241614 A | 8/2008 |
| JP | H11-246096 A | 9/1999 |

OTHER PUBLICATIONS

Written Opinion of the International Searching Authority dated Jun. 6, 2013 for the corresponding international patent application No. PCT/CN2012/001435 (and English translation).

* cited by examiner

EMBEDDED TOUCH POS MACHINE

CROSS REFERENCE TO RELATED APPLICATION

This application is a U.S. national stage application of International Application No. PCT/CN2012/001435 filed on Oct. 26, 2012 and is based on Chinese Patent Application No. 201220432061.1 filed on Aug. 29, 2012, the disclosures of which are incorporated herein by reference.

BACKGROUND OF THE INVENTION

Field of the Invention

The present invention relates to a transaction settlement apparatus, and particularly to POS machine used in catering industry or supermarket, for dish ordering, order subscription or money collection and settlement. More particularly, the present invention relates to an embedded touch POS machine that integrates input and output, remote signal transmission and reception, and printing.

Description of the Related Art

As pace of life in cities becomes faster and faster, purchase of goods is often performed by making a telephone order and getting goods through delivery by the merchant, from the supermarket, convenience store or restaurant that is closely related to people's needs, excepting the goods that have to be gotten by visiting. While ordering by telephone, a purchaser may inquire and feed back information on the goods to be ordered from a merchant, rather than involve other goods from the merchant. With development of the Internet and electronic business, more and more merchants extend their sales channels through Internet platforms, which creates a new choice for Internet users to select and order goods. In the current on-line sales mode, a merchant may perform a back-stage management in a trusted way and provide a table computer to access the Internet at a reception desk. As for a merchant with less funds and smaller business floor area, provision of a table computer not only results in an increase of investment cost but also occupies greater operation space. In addition, employees in these mini-type merchants are usually not familiar with computer operations. An embedded system is a dedicated computer system that is completely embedded inside a controlled device and is designed for specific application. The core of an embedded system is composed of one or more microprocessors or single chip microcomputers that have been preprogrammed for implementing several targets. The designer may optimize the embedded system so as to reduce its size, decrease its manufacturing cost and simplify its operations. As the embedded system and the touch screen display are used widely, it is possible to make a computer placed on the reception desk of a supermarket or restaurant for dish ordering, order subscription or money collection and settlement to be designed to be a simply operable POS machine with smaller volume and lower cost.

SUMMARY OF THE INVENTION

An object of the present invention is to provide an embedded touch POS machine that has a suitable structure and a good overall stability. This embedded touch POS machine is integrated with input and output, remote signal transmission and reception, and print. This embedded touch POS machine is simple to operate, small space occupation and has a low cost.

In order to achieve the abovementioned object, there is provided an embedded touch POS machine according to embodiments of the present invention, which comprises a touch screen display and a printer. The printer comprises a printing head, a printing main body, a printing paper scroll and a printing board. The POS machine further comprises a mounting bracket, wherein the mounting bracket comprises a box-shaped bracket body constructed of a transverse plate and a vertical plate, and a movable bracket lid mounted on a top of the box-shaped bracket body. The touch screen display is disposed on a top face of the bracket lid, the printing head is disposed at a side of a bottom face of the bracket lid, the printing head and printing paper scroll are disposed on the transverse plate of the bracket body, and the printing board is located at a bottom face of the transverse plate of the bracket body. The printing main body is located right below the printing head in a state where the bracket lid is snap-fitted to the bracket body.

The abovementioned touch screen includes an electrical source module, a wireless transmitter-receiver module, an information data processing module, an information data storage module, an information input and output module, a touch module, a sound module, a prompt lamp module and a display module, wherein an information output module is connected to the printing board.

The abovementioned printing board comprises an electrical source module, a data processing module, a data communication module, a data storage module, a motor driving module, a printing head driving module, a cutter automatic-driving module, a sound prompt module, a sensor input module, a USB and a network extension module and a money box driving module.

The abovementioned movable bracket lid is hinged to a top of one vertical plate of the box-shaped bracket body at a side thereof and is thus formed as a rotatable bracket lid, and the printing head is located at a side of the bracket lid opposite to the hinged side.

The transverse plate of the abovementioned bracket body is formed with vertical side walls extending downwards from its bottom side at a periphery of the printing board, and one vertical side wall is formed with an interface for external devices and a lead wire hole.

In order to facilitate to be connected to external devices, the abovementioned vertical side wall formed with the interface for external devices is configured to have a same direction as the vertical plate of the bracket body that is hinged with the bracket lid.

In order to facilitate to maintenance and removal, the bracket body comprises three vertical side walls, of which one vertical side wall is configured as a hinging plate hinged to the bracket lid and the other two vertical side walls are configured as right and left side plates perpendicular to the hinging plate, wherein the right and the left side plates have smaller lengths than that of the transverse plate.

In order to allow the touch screen display to obtain a suitable view angle, the right and the left side plates are configured to have, at their tops, inclining planes that are sloped from up to down in a direction away from the hinged point.

In order to obtain a compact and small POS machine, the touch screen is configured to have a vertical viewing angle. That is, upper and lower sides of the touch screen display have smaller lengths than the right and left sides thereof.

In order to facilitate to fit the printing main body and paper scroll in the box-shaped bracket body of the bracket, the abovementioned box bracket body is embedded with a plastic middle frame, wherein the plastic middle frame is provided with a recess chamber where a printing paper scroll is receivable and a rectangle aperture where the printing main body is disposed, and the plastic middle frame is provided with an outwards-folded flange that is able to be placed and hanged on top of the vertical plate and the transverse plates of the box-shaped bracket body.

In order to achieve a better inclined angle of the printing main body matching to the print head, a free end of the transverse plate of the bracket is bent forwardly and downwards to be formed as an inclining support face, and a printing main body frame is disposed between the printing main body and the transverse plate of the bracket body.

In order to protect the printing board and shield every component thereof in a better manner, a U-shaped metal base is provided at the bottom face of the transverse plate of the bracket, and the printing board is located within the metal base.

In order to obtain a water-proof POS machine in beautiful overall appearance, the abovementioned box-shaped bracket is cased with a plastic base. The plastic base is hollow at its bottom and is predefined, at its side, with an interface for external devices.

In the embedded touch POS machine according to embodiments of the present invention, with the bracket constructed of the box-shaped bracket body and the bracket lid movably placed on a top of the box bracket body, the touch screen display is placed on the surface of the bracket lid, the printing head is placed on a bottom face of the bracket lid, and the printing main body and the printing paper scroll are placed within the bracket body, such that the touch screen display and the printer form as a whole. The printing main body is right below the printing head when the bracket lid is snap-fitted to the bracket body, which not only facilitates to operate and view the touch screen display but also not interferes with normal operation of the printer. Once the printer should be maintained or the paper scroll needs to be replaced, it is only necessary to open the movable bracket lid. The POS machine according to embodiments of the present invention not only has a low cost, possesses proper structure, exhibits good and compact appearance as a whole, and owns small space occupation, but also includes a touch screen that integrates functions of input and output, remote signal transmission and reception. This POS machine is particularly suitable for being arranged at the reception desk and managed in a back stage by small dealer with less funds and a limited business area, for remote dish ordering, order subscription or money collection and settlement.

DETAILED DESCRIPTION OF EXEMPLARY EMBODIMENTS

Figure 1:
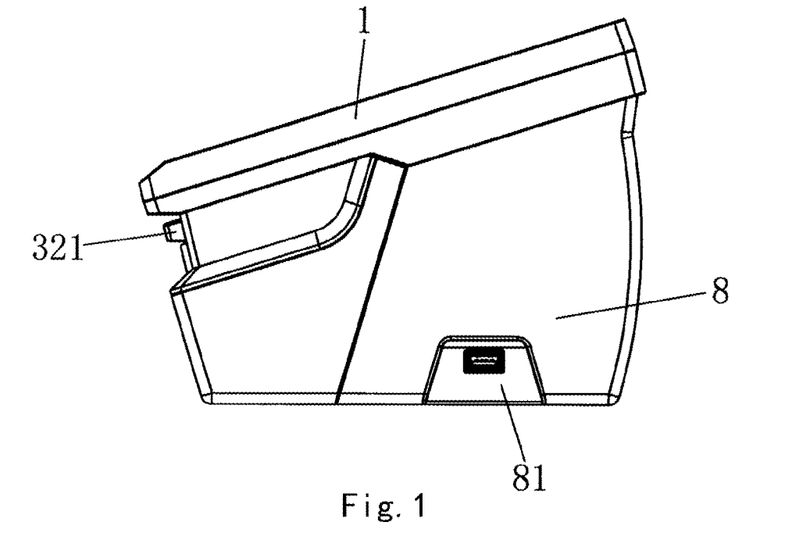
FIG. 1 is a schematic structural view of an embedded touch POS machine according to embodiments of the present invention.
Figure 2:
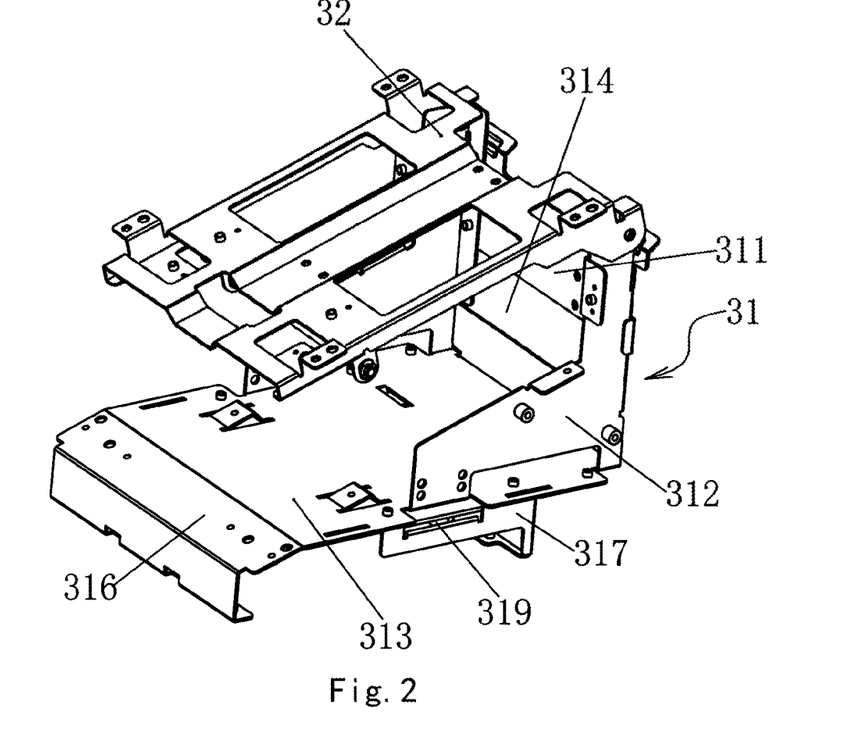
FIG. 2 is a schematic structural view of a bracket.
Figure 3:
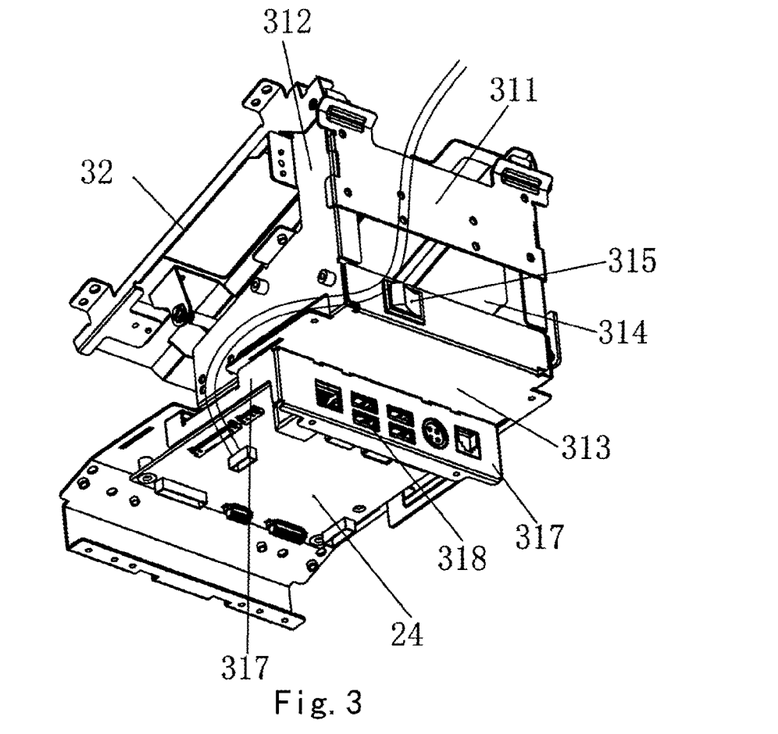
FIG. 3 is a schematic structural view of a printing board mounted on a bottom face of the bracket.
Figure 4:
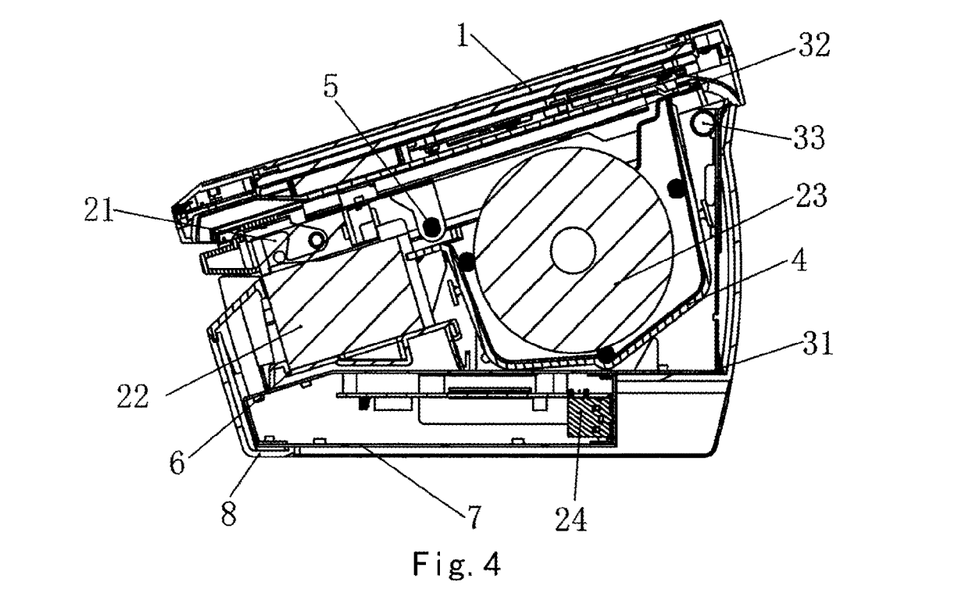
FIG. 4 is a schematic cross section view of components in a combined manner of the embedded touch POS machine according to embodiments of the present invention.
Figure 5:
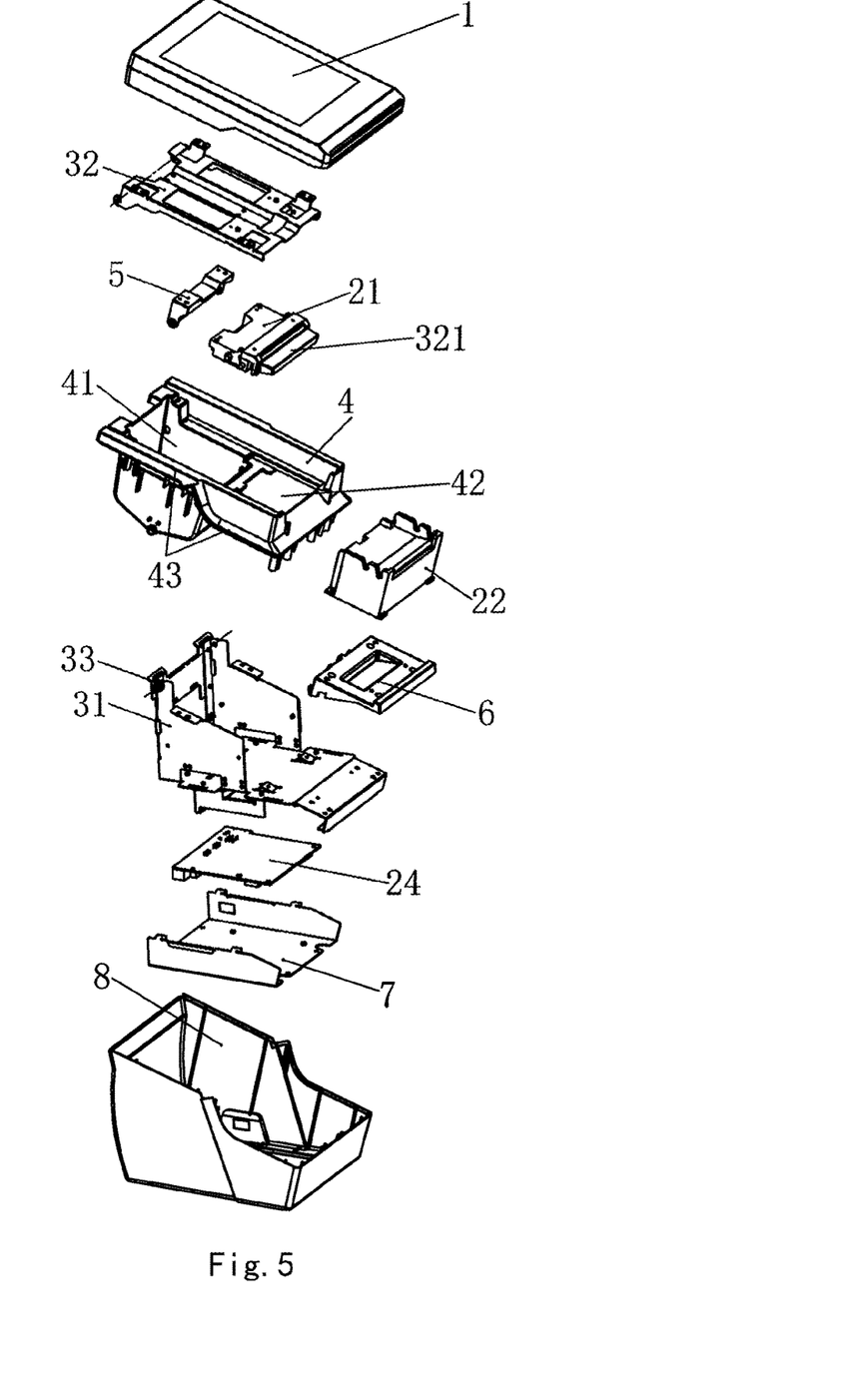
FIG. 5 is an exploded view of the embedded touch POS machine according to embodiments of the present invention as a whole.

As shown in FIGS. 1-4, an embedded touch POS machine according to embodiments of the present invention includes a display with a touch display screen, a printer and a mounting bracket 3 for mounting the touch screen display and the printer. The touch screen display 1 includes an electrical source module, a wireless transmitter-receiver module, an information data processing module, an information data storage module, an information input module, an information output module and a display module (not shown). The printer includes a printing head 21, a printing main body 22, a printing paper scroll 23 and a printing board 24. The printing board 24 includes an electrical source module, a data processing module, a data communication module, a data storage module, a motor driving module, a printing head driving module, a cutter automatically-driving module, a sound prompt module, a sensor input module, a USB and a network extension module and a money box driving module (not shown). The mounting bracket 3 includes a box-shaped bracket body 31 and a rotatable bracket lid 32. The box-shaped bracket body 31 is constructed of vertical plates and a transverse plate. There are three vertical plates, of which one is a hinging plate 311 with a rotating shaft 33 at a top thereof for being hinged with a side of the bracket lid 32, and the other two are right and left side plates 312, located respectively at either side of the hinging plate and perpendicularly to the hinging plate. The right and left side plates are smaller in length than the transverse plate 313, and have, at their tops, inclined planes sloping from up to down in a direction away from the hinging point. The hinging plate is provided with a lead wire hole 314 and an electrical source switch 315. The transverse plate is bent forwardly and downwards at its front end to be formed as an inclined support face 316. The mounting bracket encloses a plastic middle frame 4 within the bracket body thereof. The plastic middle frame is provided with a recess chamber 41 where a printing paper scroll is receivable and a rectangle aperture 42 where a printing main body is placed. The plastic middle frame is provided with an outwards-folded flange 43 that is supported and hanged on top of the vertical plate and the transverse plate of the box-shaped bracket body. The recess chamber 41 where the printing paper scroll is receivable is located near the hinging plate of the bracket body, as shown in FIG. 5. The touch screen display 1 is mounted to the top of the bracket lid and has a vertical viewing angle. That is, the upper and lower sides of the display screen are smaller in length than the right and left sides. The bracket lid is provided with a rotatable bracket lid handle 321 at its front end. The printing head 21 is mounted on the bottom of the bracket lid and is at rear of the rotatable bracket lid handle 321. A paper pressing shaft 5 is provided near the printing head and the printing paper scroll 23 is placed in the recess chamber of the plastic middle frame. The printing main body 22 is mounted within the square aperture in the plastic middle frame and is located right below the printing head. A further printing main body frame 6 is disposed between the printing main body and the transverse plate of the bracket body and is provided for adjusting an inclining angle of the printing main body such that the printing main body may be in good cooperation with the printing head. A printing board 24 is mounted on the bottom of the transverse plate of the bracket body. The transverse plate includes, at its bottom side face, along a periphery of the printing board, three vertical side walls 317 extending downwards, of which one vertical side wall is extended in the same direction as the hinging plate while the other two vertical side walls are extended in the same direction as the right and left side plates of the bracket body. The vertical side wall extending in the same direction as the hinging plate is formed with an interface 318 for external devices of the POS machine and the vertical side walls extending in the same direction as the right and left side plates are provided with a lead wire hole 319. In order to protect the printing board and to obtain better shielding for its components, the printing board is cased with a U-shaped metal base 7. In order to obtain the POS machine in a good overall appearance, the box-shaped bracket is surrounded by a plastic base 8 at its periphery. The plastic base is hollow at its bottom and is predefined at its side with an interface 81 for external devices 81.

Figure 6:
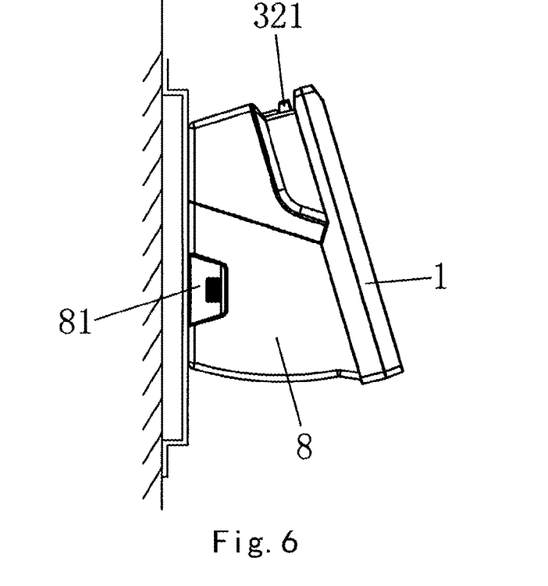
FIG. 6 is a schematic view of usage of another embedded touch POS machine according to embodiments of the present invention.

The abovementioned embedded touch POS machine may be placed on a table or be hanged on a wall by a hanging steel plate on the wall, as shown in FIG. 6.

The detailed description abovementioned has been just described for an embodiment of the embedded touch POS machine of the present invention and is not provided for limiting the protective scope of the present invention. Various modifications or alternatives to these embodiments without departing from the principles and spirit of the present invention, such as, the bracket lid of the bracket being configured to be opened by displacement or jacking, fall into the scope of the present invention.

Figure 7:
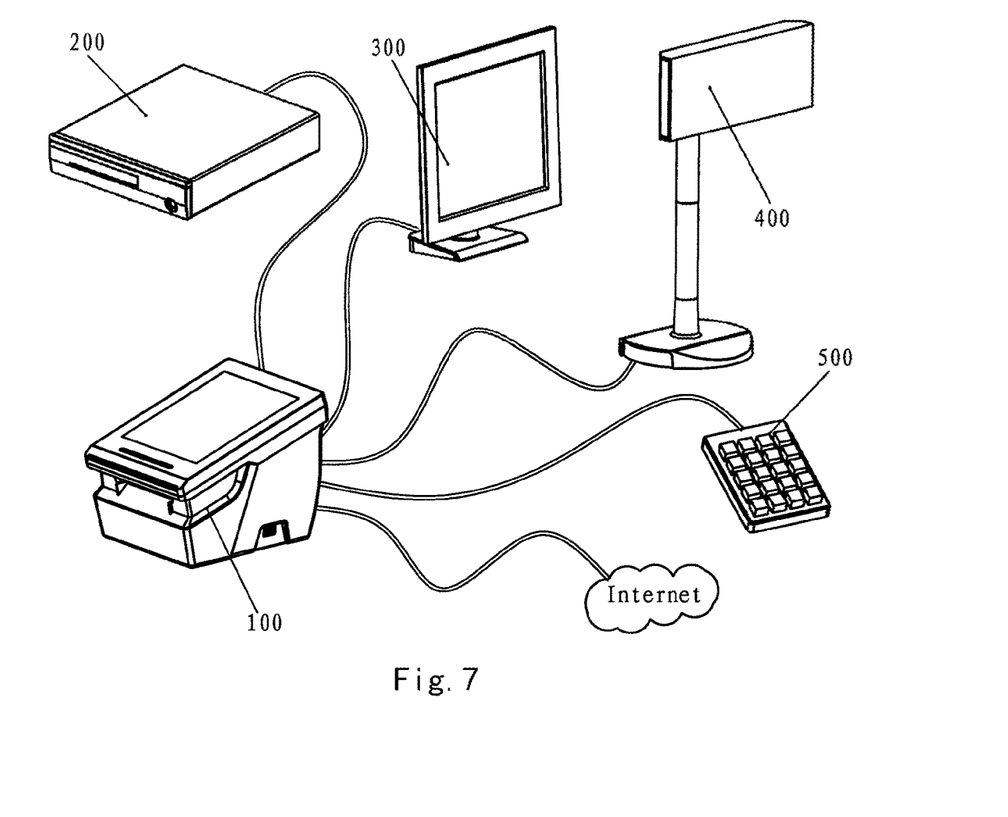
FIG. 7 is a structural view of connection of the embedded touch POS machine according to embodiments of the present invention to external devices.

According to an embodiment of the present invention, an embedded touch POS machine 100 includes an open system that may be implemented in various platforms and application software, and also, this embedded touch POS machine 100 may be connected to various external devices, such as, a money box 200, an advertising screen 300, a client display 400 and a pinpad 500 and may be implemented through IC card, bank card authorization terminal The embedded touch POS machine 100 may be used in stand-alone mode or through network. The embedded touch POS machine 100 may also be connected to Internet, as shown in FIG. 7. The embedded touch POS machine 100 according to an embodiment of the present invention may be used in the following applications.

1. Application in stand-alone mode or in a network mode, for cashiering in a shop:

When used in stand-alone mode, the embedded touch POS machine according to an embodiment of the present invention may be connected to a card reader or other external devices to perform, such as, cashiering operation by touch, instead of by mouse and keyboard. Also, the embedded touch POS machine may be combined with a cloud server so as to store business data every day of a shop in the cloud server, allowing a shopman to read report information of the business data from the cloud server everywhere at any time.

2. Application (1) through connecting the Internet, for a convenience store or a restaurant receiving orders for deliveries.

When an order message is sent to a cloud server from a mobile phone, the embedded touch POS machine according to an embodiment of the present invention automatically receives the order message conveyed by the cloud server under being connected to the Internet. After an operation of accepting, rejecting or reordering, the printer within the embedded touch POS machine may automatically print a bill in response to the result. When an ordering bill is printed, a bar code on the bill is scanned by an externally connected scanner gun, thereby a procedure of processing an order being finished. During this procedure, the embedded touch POS machine sends information resulted in each stage back to the cloud server and the cloud server transmits it to the user's mobile phone.

3. Application (2) through connecting the Internet, for ordering food by an electronic menu.

When a user submits an order in a single machine and then a new order message is sent to background server, the new order message will be checked in a common PC at a restaurant, as a result, the process including dish ordering, printing of a bill and sending of the bill to cookroom is saved. When food is ready, a prompt may be provided.

4. Application (3) through connecting the Internet, as an ordering machine in a dining room.

In a company canteen, an employee always spends lots of his rest time on standing in a line for getting food, particularly in a company with numerous employees. When a POS machine according to embodiments of the present invention is used, the employee may select and order his/her preferred food on a touch screen display before standing in a line. The workers in the canteen may check the ordered food through another terminal and prepare it ahead, as a result, not only the time for getting food is saved, but also unwanted communication trouble is avoided.

5. Application (4) through connecting the Internet, as a queue management machine or an order number delivery machine.

In a bank hall or a favored restaurant, waiting in a line for business often occurs in crowding time. A POS machine according to embodiments of the present invention installed with a specific software may be used. Clients may select a desired service on the touch screen display of the machine and achieve a printed number note from the printer of the machine, thereby bringing convenience the clients to carry on business.

What is claimed is:

1. An embedded touch POS machine, comprising:
   a touch screen display;
   a printer, the printer comprising a printing head, a printing main body, a printing paper scroll and a printing board; and
   a mounting bracket, the mounting bracket including:
      a box-shaped bracket body constructed of a transverse plate and a vertical plate; and
      a movable bracket lid mounted on a top of the box-shaped bracket body, the bracket lid has a top face and a bottom face opposite to the top face; wherein
   a back end of the embedded touch POS machine has a height greater than a front end of the embedded touch POS machine in the state where the bracket lid is snap-fitted, the front end is opposite to the back end,
   the touch screen display is disposed on the top face of the bracket lid,
   the printing head is disposed on the bottom face of the bracket lid,
   the printing main body and the printing paper scroll are disposed on the transverse plate of the bracket body,
   the printing board is located at a bottom face of the transverse plate of the bracket body,
   the printing main body is located right below the printing head in the state where the bracket lid is snap-fitted to the bracket body,
   the transverse plate is bent forwardly and downwards at the front end of the embedded touch POS machine to be formed as an inclined support face that matches an angle of the printing head in the state where the bracket lid is snap-fitted, and the embedded touch POS machine further comprises a printing main body frame disposed between the printing main body and the transverse plate of the bracket body and configured to adjust an inclining angle of the printing main body in relation to a main plane of the transverse plate such that the printing main body is disposed to cooperate with the printing head in the state where the bracket lid is snap-fitted.

2. The embedded touch POS machine according to claim 1, wherein the touch screen display comprises an electrical source module, a wireless transmitter-receiver module, an information data processing module, an information data storage module, an information input module, an information output module, a sound module, a prompt lamp module, a display module and a touch module, wherein an information output module is connected to the printing board.

3. The embedded touch POS machine according to claim 1, wherein the printing board comprises an electrical source module, a data processing module, a data communication module, a data storage module, a motor driving module, a printing head driving module, a cutter automatic-driving module, a sound prompt module, a sensor input module, a USB and a network extension module and a money box driving module.

4. The embedded touch POS machine according to claim 1, wherein the movable bracket lid is hinged to a top of the vertical plate of the box-shaped bracket body at a side thereof and is thus formed as a rotatable bracket lid, and a side of the bracket lid where the printing head is disposed is opposite to the hinged side where the movable bracket lid is hinged to the top of the vertical plate.

5. The embedded touch POS machine according to claim 4, wherein the transverse plate of the bracket body is formed with vertical side walls extending downwards from its bottom side along periphery of the printing board, in which the vertical side wall is formed with an interface for external devices of the POS machine and a lead wire hole, wherein the vertical side wall formed with the interface for external devices is configured to have a same direction as the vertical plate of the bracket body that is hinged with the bracket lid.

6. The embedded touch POS machine according to claim 5, wherein the bracket body comprises three vertical side walls, of which one vertical side wall is configured as a hinging plate hinged to the bracket lid and the other two vertical side walls are configured as right and left side plates perpendicular to the hinging plate, wherein the right and the left side plates have smaller lengths in a front-back direction than a length of the transverse plate in the front-back direction, wherein the front-back direction is a direction from the front end of the embedded touch POS machine to the back end of the embedded touch POS machine, and the right and left side plates are configured to have, at their tops, inclining planes sloping from up to down in a direction away from the hinged point.

7. The embedded touch POS machine according to claim 6, wherein the touch screen display is configured to have a vertical viewing angle, that is, upper and lower sides of the touch screen display have smaller lengths than the right and left sides of the touch screen display.

8. The embedded touch POS machine according to claim 7, wherein the box-shaped bracket body is embedded with a plastic middle frame, wherein the plastic middle frame is provided with a recess chamber where a printing paper scroll is receivable and a rectangle aperture where the printing main body is disposed, and the plastic middle frame is provided with an outwards-folded flange that is able to be placed and hanged on top of the vertical plate and the transverse plate of the box-shaped bracket body.

9. The embedded touch POS machine according to claim 8, wherein a free end of the transverse plate of the bracket is bent forwardly and downwards to be formed as an inclining support face.

10. The embedded touch POS machine according to claim 9, further comprising a U-shaped metal base, the U-shaped metal base is provided at the bottom face of the transverse plate of the bracket, and the printing board is located within the metal base.

11. The embedded touch POS machine according to claim 10, further comprising a plastic base which is hollow at its bottom and is predefined, at its side, with an interface for external devices, wherein the box-shaped bracket is cased by the plastic base.

12. The embedded touch POS machine according to claim 11, wherein the bracket, the printing main body, the printing paper scroll, the printing board, and the transverse plate and the vertical plate of the box-shaped bracket body are surrounded by and disposed inside the hollow plastic base; and the movable bracket lid covers a top of the hollow plastic base, the printing head is disposed inside the hollow plastic base, and the printing main body is located below the printing head on the bottom face of the bracket lid, in the state where the bracket lid is snap-fitted to the bracket body.

13. The embedded touch POS machine according to claim 1, further comprising a hollow base, wherein the bracket, the printing main body, the printing paper scroll, the printing board, and the transverse plate and the vertical plate of the box-shaped bracket body are surrounded by and disposed inside the hollow base; and the movable bracket lid covers a top of the hollow base, the printing head is disposed inside the hollow base, and the printing main body is located below the printing head on the bottom face of the bracket lid, in the state where the bracket lid is snap-fitted to the bracket body.

14. The embedded touch POS machine according to claim 1, wherein the printing head is mounted on the bottom face of the bracket lid.

15. The embedded touch POS machine according to claim 1, wherein the printing main body frame has, in a side cross section view from a top to a bottom of the embedded touch POS machine, a generally triangular shape.

16. The embedded touch POS machine according to claim 15, wherein the printing main body frame further has (i) a bottom face with a first portion that is parallel to a plane of a bottom of the embedded touch POS machine and a second portion at the inclining angle, the first portion resting on the transverse plate and the second portion resting on the inclined support face, and (ii) a top face opposite to the bottom face, an entirety of the top face which is below the printing main body is at the inclining angle.

* * * * *